United States Patent [19]

Schrage et al.

[11] 3,876,609

[45] *Apr. 8, 1975

[54] USE OF XYLENE IN CONTROLLING MELT FLOW OF MODIFIED POLYOLEFIN COMPOSITIONS

[75] Inventors: Albert Schrage; Philip D. Readio, both of East Orange, N.J.

[73] Assignee: Dart Industries Inc., Los Angeles, Calif.

[ * ] Notice: The portion of the term of this patent subsequent to Oct. 3, 1989, has been disclaimed.

[22] Filed: July 31, 1972

[21] Appl. No.: 276,601

Related U.S. Application Data

[63] Continuation-in-part of Ser. No. 81,526, Oct. 16, 1970, Pat. No. 3,696,169, and a continuation-in-part of Ser. No. 129,623, March 30, 1971.

[52] U.S. Cl.... 260/42.18; 260/373 EP; 260/94.7 A; 260/827; 260/878 R; 117/100 C; 260/836; 260/42.28
[51] Int. Cl............................................ C08g 45/04
[58] Field of Search............ 260/836, 94.7 A, 42.18; 117/100 C

[56] References Cited
UNITED STATES PATENTS

| | | | |
|---|---|---|---|
| 3,179,485 | 4/1965 | Kawasaki | 204/159.17 |
| 3,322,661 | 5/1967 | Yoshikawa | 204/159.17 |
| 3,696,169 | 10/1972 | Schrage | 260/836 |

FOREIGN PATENTS OR APPLICATIONS

| | | | |
|---|---|---|---|
| 1,038,726 | 8/1966 | United Kingdom | 260/857 |
| 3,713,880 | 9/1962 | Japan | |
| 4,218,327 | 9/1967 | Japan | |
| 447,345 | 3/1969 | Japan | |
| 4,316,392 | 7/1968 | Japan | |
| 4,328,461 | 12/1968 | Japan | |

OTHER PUBLICATIONS

Chemical Abstracts R1, 59, 7722c, 1963; R2, 68, 22496x, 1968; R3, 70, 58846s, 1969; R4, 70, 79086j, 1969; R5,I 71, 22877j, 1969; R6, 71, 22878k, 1969; R7, 71, 22879m, 1969; R8, 71, 14138d, 1969.

*Primary Examiner*—Paul Lieberman
*Attorney, Agent, or Firm*—Fred S. Vailes, Esq.; Margareta LeMaire

[57] ABSTRACT

In modified polyolefin compositions prepared by reacting an olefin polymer with a polymerizable compound generally defined by

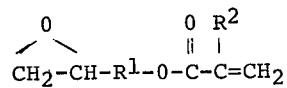

in the presence of an organic peroxide, the melt flow may be controlled by including in the reaction mixture a quantity of xylene. The reaction product is particularly suited for reinforcement with filamentary material or as a coating on metallic surface.

10 Claims, No Drawings

USE OF XYLENE IN CONTROLLING MELT FLOW OF MODIFIED POLYOLEFIN COMPOSITIONS

DISCLOSURE

This application is a continuation-in-part of pending applications, Ser. No. 81,526 filed Oct. 16, 1970, now U.S. Pat. No. 3,696,169 and Ser. No. 129,623 filed Mar. 30, 1971.

This invention relates to improvements in modified polyolefin compositions having good adhesiveness characteristics and methods for their preparation.

Modified polyolefin compositions having good adhesiveness characteristics, particularly toward polar materials, are described in copending application Ser. No. 81,526, filed Oct. 16, 1970. These compositions are formed, in general, by reacting an olefin polymer with certain ethylenically unsaturated polymerizable compounds in the presence of an organic peroxide. While the resulting modified polyolefin compositions exhibit adhesiveness characteristics which are far superior to the unmodified polyolefins the melt flow of the compositions is undesirably high. As is well known, polymers having undesirably high melt flow values also undergo a reduction in physical properties such as tensile strength, flexural strength and impact strength.

This invention provides a solution to the problems of unduly high melt flow in these modified polyolefin compositions. Briefly, the invention involves the use of xylene in the reaction of the olefin polymer with the ethylenically unsaturated polymerizable compound in the presence of the organic peroxide. Xylene is merely charged along with the other reactants to a reactor and the entire mixture is subjected to the usual polymerization conditions. The resulting modified polyolefin compositions have far lower melt flow values than such compositions prepared without the use of the xylene.

Briefly described, modified polyolefin compositions of this invention are produced by the process comprising providing an olefin polymer derived from alpha-olefin monomers having 2 to 10 carbon atoms in particulate form; admixing the particulate olefin polymer with xylene, organic peroxide and a polymerizable compound defined by

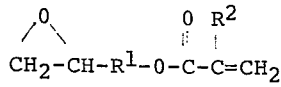

wherein $R^1$ and $R^2$ are hereinafter defined; reacting the resulting mixture at a temperature below the tacky point of the polymer; and recovering a modified polyolefin composition directly from the reaction in particulate form. Various advantages are achieved with this process among which is included the production of a modified polyolefin composition having improved melt flow and adhesiveness characteristics directly in particulate form. Since the reaction is conducted without the necessity of melting the polymer there is no requirement for comminuting or grinding the product to obtain a freeflowing particulate product. Moreover, it is believed that a more uniformly modified composition is obtained from the process due to the high total surface area of the polymer exposed during the reaction as well as the ability to obtain intimate mixing of the ingredients.

The polyolefins suitable for use in the process are those derived from alpha-olefin monomers having 2 to 10 carbon atoms. Included among these are polyethylene, polypropylene, poly(butene-1), poly(4-methylpentene-1), ethylene-propylene copolymers, and terpolymers of ethylene-propylene-butene-1.

As mentioned above, in accordance with this invention, these polyolefins are in particulate form such as powders, granules, chips, pellets, and the like, all of which are commercially available. Powdered polyolefins are preferred as the greatest surface area is thus obtained. Powders having an average particle size in the range of about 0.001 mm to about 4mm are particularly preferred, more preferably 0.01 to 1 mm. The use of powdered polyolefins is a specific feature of the process of this invention since such powders are inherently produced in certain olefin polymerization processes, most notably polypropylene and polyethylene. Thus, the process of this invention may easily be incorporated in such olefin polymerization processes as an optional sequence of steps to provide an additional capability of producing the modified polyolefin compositions with a minimum of additional equipment.

The polymerizable compounds include one group of compounds defined by

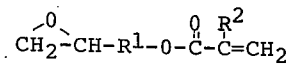

wherein
$R^1$ is a cyclic, straight or branched chain alkylene group having 1 to 20 carbon atoms;

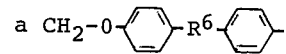

group
wherein
$R^6$ is a straight or branched chain alkylene radical having 1 to 10 carbon atoms, oxygen, sulfur, amino,

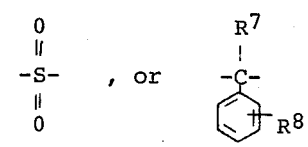

wherein
$R^7$ is H or lower alkyl and $R^8$ is lower alkyl;

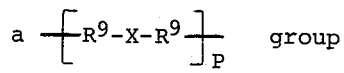

wherein
each $R^9$ is a straight or branched chain lower alkylene, X is an amino group or an oxygen or sulfur atom, and $p$ is an integer of 1 to 20;

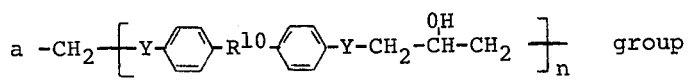

wherein

Y represents oxygen or sulfur atoms, $R^{10}$ is a straight or branched chain alkylene radical having 1 to 10 carbon atoms,

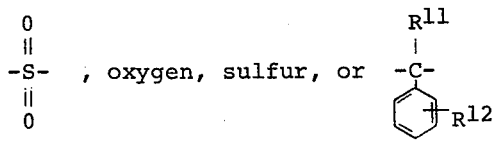

wherein $R^{11}$ is H or lower alkyl and $R^{12}$ is lower alkyl; and $n$ is an integer of 1 to 20;

a

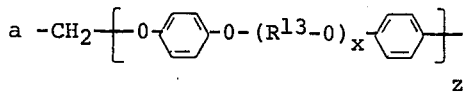

group
wherein $R^{13}$ is lower alkyl, $x$ is an integer of 1 – 10 and $z$ is an integer of 1 – 10;

a

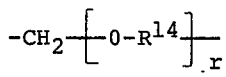

group
wherein $R^{14}$ is lower alkyl and $r$ is an integer of 1 – 100;

a 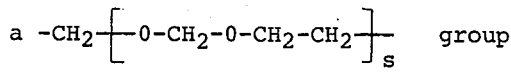 group wherein $s$ is an integer of 1 to 100; and $R^2$ is H or $CH_3$.

By way of specific example of some of the compounds included in this definition there may be mentioned glycidyl acrylate; glycidyl methacrylate; the acrylic and methacrylic esters of the monoglycidyl ether of sulfonyl bis-phenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of α, α-bis(p-hydroxyphenyl) tolylethane; the acrylic and methacrylic esters of 3-oxy-6,7-epoxyheptanol, 3-aza-6,7-epoxyheptanol and 3-thia-6,7-epoxyheptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with α,α-bis(p-hydroxyphenyl) tolylethane or α,α-bis(p-thiophenyl) tolylethane; the acrylic and methacrylic esters of poly ($C_1$–$C_4$ alkyleneoxide glycol) monoglycidyl ether; and the acrylic and methacrylic esters of poly [(co-alkylene-phenyleneoxide) glycol] monoglycidyl ether. The polymerizable compound is preferably employed in an amount of 0.01 to 10 percent by weight based on the olefin polymer.

The organic peroxides useful in the process of this invention include both solid and liquid organic peroxides. In order to insure good distribution of the peroxide throughout the mixture of ingredients prior to reaction it is preferred to use a liquid form of the peroxide. Thus, for convenience, those organic peroxides which are normally liquid or which become liquid at or near the temperature at which the particular reaction is run are preferred over the solid-type organic peroxides. However, by dissolving the solid organic peroxides in a suitable organic solvent, that is one that has no substantial adverse effect on free radical polymerization reactions, a suitable physical form is obtained which can be used with substantially equal success in the process of the invention. Since the solvent, for this purpose, merely functions as a carrier for the solid organic peroxide it makes no difference whether or not it becomes vaporized prior to reaching reaction temperature since the peroxide at that point in the process has already been distributed throughout the ingredients.

Some examples of suitable peroxides include di-t-butyl peroxide, t-butyl hydroperoxide, methyl ethyl ketone peroxide, t-butyl perbenzoate, t-butyl peracetate, t-butyl peroxypivalate, acetyl peroxide, t-butyl peroctoate, t-butyl peroxyisobutyrate, decanoyl peroxide, lauroyl peroxide, benzoyl peroxide, 2,5-dimethylhexane-2,5-diperoxybenzoate, cyclohexanone peroxide, cumene hydroperoxide, p-menthane hydroperoxide, di-t-butyl-diperoxyphthalate, cumyl peroxide, caproyl peroxide, and the like. Of course, there are additional organic peroxides in this group but are too numerous to attempt to individually name. As mentioned previously, it is preferred that the organic peroxide be in a liquid form or capable of dissolution in a substantially inert organic solvent at or near the temperature at which the particular reaction is carried out.

Selection of a particular organic peroxide or mixture of organic peroxides of the type mentioned above may be easily determined based on the temperature at which the particular reaction is to be carried out and the corresponding decomposition rate of the peroxides as evidenced by their respective half-lives. The half-lives of peroxides are well known and may be readily ascertained (see U.S. Pat. No. 3,293,233).

It is pointed out that oxygen preferably should not be employed in the process even though it is sometimes regarded as a free radical initiator. Oxygen is known to cause deleterious effects on polymerizable acrylate monomers such as the polymerizable compounds used in the process of this invention (see page 36 of the reprint of Chapters I–IV from Monomeric Acrylic Esters by E. H. Riddle, 1954). Since oxygen has some adverse effect on the reaction it is desirable to conduct the reaction in a substantially oxygen-free atmosphere if possible. While small amounts of oxygen can probably be tolerated in the system effort should be made to prevent introduction of additional oxygen over and above what may be initially present. Preferably, the reactor is purged with an inert gas prior to conducting the reaction.

The xylene is added to the olefin polymer particles prior to reaction and is evenly distributed throughout. Preferably, 0.01 to 10 percent by weight of xylene based on the olefin polymer are employed. This amount does not visually appear to change the dry nature of the mixture of ingredients prior to reaction. It is not known as to just how the minor amount of xylene functions in the process. In any event, whatever the mechanism, the result is a desirable reduction in melt flow and further enhancement of the bonding ability of the modified composition as evidenced by an increase in flexural strength of glass fiber reinforcement of the compositions. The most significant increases are obtained when at least 0.5 part by weight of the polymerizable compound is employed.

As described previously, in accordance with the process of the invention, the above ingredients, that is the olefin polymer in particulate form, the polymerizable compound, the xylene and the organic peroxide, are admixed on a substantially dry basis. The amount of liquid is insufficient to cause any discernible change in the dry-appearance of the mixture.

The admixing of the ingredients may be accomplished by merely charging the ingredients, separately or simultaneously to a mixing apparatus such as a Henschel mixer. After achieving homogenization of the ingredients in the mixer the mixer is transferred to a reaction zone for reaction as hereinafter described. Rather than separately mixing the ingredients remote from the reaction they may also be charged directly to a reactor equipped with some means for agitation or tumbling to achieve homogenization of the ingredients within the reaction zone.

In any event, once the mixture is present in the reaction zone the zone is preferably purged of any oxygen with an inert gas and the reaction is conducted at a temperature which is below the tacky point of the olefin polymer to avoid agglomeration of the polymer particles. The tacky point of the olefin polymer is defined as that temperature at which the surfaces of the polymer particles become sufficiently soft so as to be tacky and tend to stick to one another and to other surfaces. Preferably, some mild agitation is provided to insure good heat transfer and help to maintain the homogeneity of the mixture during reaction. The precise temperature at which the reaction will be carried out will vary depending on the specific olefin polymer, the specific polymerizable compound and the specific organic peroxide or peroxide mixture employed. Generally, it will be somewhere in the range of 0°C up to below the tacky point of the olefin polymer. For polypropylene the upper temperature limit will be about 150°C, for high density polyethylene (e.g., 0.930 and above) it will be about 120°C and for low density polyethylene (e.g., below 0.930) it will be about 90°C. Thus, it is apparent that the upper temperature limit will vary considerably depending on the particular polymer.

The pressure at which the reaction is conducted is not critical and, in general, good results can be obtained at pressures in the range of atmospheric up to about 1,000 psi. For practical reasons it is convenient to operate from about atmospheric up to about 200 psi and under conditions to assure that the xylene is maintained in the reaction zone. As indicated previously, the reaction zone is usually purged with an inert gas to remove any oxygen prior to conducting the reaction. In some instances it may be convenient to merely close the system and begin the reaction whereby an autogenous pressure is built up and maintained. In other instances it may be convenient to close the system and pressurize the reaction zone with the inert gas, e.g., carbon dioxide, nitrogen, argon, etc. in order to prevent excessive volatilization of volatile ingredients.

The reaction zone may be of a fluid bed type wherein the admixed ingredients are charged to form the bed. The system is then preferably purged with the inert gas to remove oxygen and closed. An externally heated inert gas is then continuously circulated through the bed as is known in these systems and the reaction proceeds. The movement of the inert gas through the bed conveniently provides agitation sufficient to aid heat transfer and maintain the homogenity.

In a variation of the above described fluid bed reaction it is also possible to form the bed solely from the olefin polymer particles and inject the necessary quantities of the polymerizable compound, xylene and organic peroxide, either separately or as a mixture, into the heated gas stream prior to its passage through the bed of polymer particles. In this manner, the flow of the gas stream serves to agitate the polymer particles and uniformly distribute the polymerizable compound, xylene and organic peroxide throughout the particles as the reaction proceeds.

Another type of reaction zone for conducting the process of this invention is provided by a vessel equipped with helical ribbons. With this system it is not necessary to separately mix the ingredients and then charge them to the vessel as the ribbons in the vessel will adequately mix the materials when separately charged. Heating of the mixture is accomplished through external jacketed heating means. The ribbons function to aid heat transfer and maintain good mixing of the ingredients.

In conducting the reaction it is desirable to completely decompose the organic peroxide before recovering the product as the presence of any residual peroxide, even in small quantities, may adversely affect the resulting composition in subsequent compounding, molding or extruding operations.

The resulting modified polyolefin composition may be easily recovered directly from the reaction zone in particle form and thus is suitable for subsequent operations as mentioned above without any further steps such as comminuting. The composition exhibits increased bonding with such materials as glass, particularly glass fibers used in reinforcing compositions of this type.

The reaction product, that is the resulting composition of this invention is particularly suited for reinforcement with filamentary material such as glass fibers on asbestos in amounts ranging from about 5 to 90 percent by weight. Such reinforced compositions may be produced in accordance with conventional techniques, see U.S. Pat. Nos. 3,416,990; 3,453,356 and 3,042,570. In addition, the reaction product is useful in coating surfaces, e.g., metallic or glass containers and the like, due to the adhesiveness properties it possesses.

Other additives may be incorporated in the reaction product including fillers, pigments, stabilizers, antioxidants, anti-static agents, flame retardants and the like.

The following example will serve to further illustrate the invention.

EXAMPLE 1

A mixture comprising 100 parts by weight polypropylene particles (average size in the range of 0.01 to 4 mm), 1.0 part by weight glycidyl acrylate, 0.5 part by weight t-butyl peracetate (75 percent solution in benzene) and 2.0 parts by weight xylene were mixed in a Waring blender and charged to a reactor with a paddle stirrer. The dry-appearing free-flowing mixture was stirred to distribute the materials while first purging the system with argon and then heating to about 125°C under autogenous pressure. The mixture was maintained at about 125°C for about 4 hours while continuing the stirring and then cooled and subjected to vacuum to remove any volatiles present. The resulting composition was recovered directly from the reactor in a particulate form.

For comparison, a second composition was prepared using the same procedure except that no xylene was employed. The product was recovered in a particulate form.

Each of the above compositions was tested for melt flow (230°C) in accordance with ASTM D-1238 and then blended with 20 weight percent chopped glass fibers (one-fourth inch, OCF 885) for testing for flexural strength and flexural modulus properties in accordance with ASTM D-790-66. The results of these evaluations are indicated in the following table.

TABLE 1[a]

| Sample No. | Xylene (Parts by Weight) | Melt Flow | Flexural Strength (psi) | Flexural Modulus (psi) ($\times 10^{-5}$) |
|---|---|---|---|---|
| 1A | 2.0 | 26 | 15,500 | 4.6 |
| 1B | 2.0 | 8 | 14,900 | 4.6 |
| 1C | 2.0 | 25 | 14,500 | 4.2 |
| 2A | — | 54 | 15,100 | 4.4 |
| 2B | — | 48 | 14,100 | 4.5 |
| 2C | — | 62 | 14,600 | 4.3 |

[a]All samples prepared using 0.5 part peroxide

Thus having described the invention in detail it will be understood by those skilled in the art that certain variations and modifications may be made without departing from the spirit and scope of the invention as described herein or in the appended claims.

We claim:

1. A solid state process for preparing a modified polyolefin composition having improved melt flow characteristics which comprises:
   a. providing an olefin polymer in particulate form, said olefin polymer being derived from alpha-olefin monomers having 2 to 10 carbon atoms,
   b. admixing the olefin polymer in particulate form with an organic peroxide, from 0.01 to 10 percent based on the weight of the olefin polymer of xylene and from 0.01 to 10 percent based on the weight of the olefin polymer of a polymerizable compound to provide a substantially dry mixture, said polymerizable compound being defined by $$\underset{CH_2-CH-R^1-O-C-C=CH_2}{\overset{O\qquad\quad O\ R^2}{\diagup\!\diagdown\quad\ \ \|\ \ |}}$$

wherein
R$^1$ is a cyclic, straight or branched chain alkylene group having 1 to 20 carbon atoms;

a $$-CH_2-\!\!\left\langle\!\!\bigcirc\!\!\right\rangle\!\!-R^6\!\!-\!\!\left\langle\!\!\bigcirc\!\!\right\rangle\!\!-$$

group
wherein
R$^6$ is a straight or branched chain alkylene radical having 1 to 10 carbon atoms, oxygen, sulfur, amino, $$-\underset{\underset{O}{\|}}{\overset{\overset{O}{\|}}{S}}-\ ,\ \text{or}\ -\underset{\underset{\langle\bigcirc\rangle\!-R^8}{}}{\overset{R^7}{\underset{|}{C}}}-$$

wherein
R$^7$ is H or lower alkyl and R$^8$ is lower alkyl;

a $-\!\!\left[R^9-X-R^9\right]_p\!\!-$ wherein
each R$^9$ is a straight or branched chain lower alkylene, X is an amino group or an oxygen or sulfur atom, and p is an integer of 1 to 20;

a $$-CH_2-\!\!\left[-Y-\!\!\left\langle\bigcirc\right\rangle\!\!-R^{10}\!\!-\!\!\left\langle\bigcirc\right\rangle\!\!-Y-CH_2-\overset{OH}{\underset{|}{CH}}-CH_2\right]_n\!\!-$$

group
wherein
Y represents oxygen or sulfur atoms, R$^{10}$ is a straight or branched chain alkylene radical having 1 to 10 carbon atoms, $$-\underset{\underset{O}{\|}}{\overset{\overset{O}{\|}}{S}}-\ ,$$

oxygen, sulfur, or $$-\underset{\underset{\langle\bigcirc\rangle\!-R^{12}}{}}{\overset{R^{11}}{\underset{|}{C}}}-$$

wherein
R$^{11}$ is H or lower alkyl and R$^{12}$ is lower alkyl; and n is an integer of 1 to 20;

a $$-CH_2-\!\!\left[-O-\!\!\left\langle\bigcirc\right\rangle\!\!-O-(R^{13}-O)-\!\!\underset{x}{}\!\!-\!\!\left\langle\bigcirc\right\rangle\right]_z\!\!-$$

group
wherein
R$^{13}$ is lower alkyl, x is an integer of 1 to 10 and z is an integer of 1 to 10;

a $-CH_2\!\!-\!\!\left[O\!\!-\!\!R^{14}\right]_r\!\!-$ group
wherein
R$^{14}$ is lower alkyl and r is an integer of 1 to 100;

a $-CH_2\!\!-\!\!\left[O\text{-}CH_2\!\!-\!\!O\!\!-\!\!CH_2\!\!-\!\!CH_2\right]_s\!\!-$ group
wherein $s$ is an integer of 1 to 100; and $R^2$ is H or $CH_3$,
c. reacting the resulting mixture in a reaction zone at a temperature below the tacky point of the olefin polymer and at a pressure sufficient to maintain the xylene within the reaction zone, and
d. recovering a modified polyolefin composition directly from the reaction in particulate form.

2. A process according to claim 1, wherein $R^1$ is a $C_1$–$C_{18}$ alkylene group and $R^2$ is H or $CH_3$.

3. A process according to claim 1, wherein the reaction is conducted in the absence of oxygen.

4. A process according to claim 1, wherein the polymerizable compound is glycidyl acrylate or glycidyl methacrylate.

5. A process according to claim 1, wherein the olefin polymer is polypropylene, polyethylene or a copolymer of ethylene and propylene.

6. A particulate modified polyolefin composition obtained in a solid state process by reacting in a reaction zone a substantially dry mixture of
   a. at least one olefin polymer in particulate form and derived from alpha-olefin monomers having 2 to 10 carbon atoms,
   b. from about 0.01 to about 5 percent by weight based on the olefin polymer of an organic peroxide,
   c. from about 0.01 to about 10 percent by weight of the polyolefin polymer of xylene, and
   d. from about 0.01 to about 10 percent based on the weight of the polyolefin polymer of a polymerizable compound defined by $$\underset{CH_2-CH-R^1-O-C-C=CH_2}{\overset{O \qquad\qquad O \; R^2}{\diagdown\diagup \qquad\quad \| \; |}}$$

wherein
   $R^1$ is a cyclic, straight or branched chain alkylene group having 1 to 20 carbon atoms;

a $$-CH_2-O-\langle\bigcirc\rangle-R^6-\langle\bigcirc\rangle-$$

group
wherein
   $R^6$ is a straight or branched chain alkylene radical having 1 to 10 carbon atoms, oxygen, sulfur, amino, $$\overset{O}{\underset{O}{\overset{\|}{-S-}\|}}$$

, or $$\underset{\underset{\langle\bigcirc\rangle\!\!\!\!-R^8}{|}}{-\overset{R^7}{\underset{|}{C}}-}$$

wherein
   $R^7$ is H or lower alkyl and $R^8$ is lower alkyl;

a $-\!\!\left[R^9\text{-}X\text{-}R^9\right]_{\!p}\!-$ group
wherein
   each $R^9$ is a straight or branched chain lower alkylene, X is an amino group or an oxygen or sulfur atom, and $p$ is an integer of 1 to 20;

a $$-CH_2-\!\!\left[-Y-\!\langle\bigcirc\rangle\!-R^{10}-\!\langle\bigcirc\rangle\!-Y-CH_2-\overset{\overset{OH}{|}}{CH}-CH_2-\right]_n$$

group
wherein
   Y represents oxygen or sulfur atoms, $R^{10}$ is a straight or branched chain alkylene radical having 1 to 10 carbon atoms, $$\overset{O}{\underset{O}{\overset{\|}{-S-}\|}}$$

oxygen, sulfur, or $$\underset{\underset{\langle\bigcirc\rangle\!\!\!\!-R^{12}}{|}}{-\overset{R^{11}}{\underset{|}{C}}-}$$

wherein
   $R^{11}$ is H or lower alkyl and $R^{12}$ is lower alkyl; and $n$ is an integer of 1 to 20;

a $$-CH_2-\!\!\left[-O-\!\langle\bigcirc\rangle\!-O-(R^{13}-O)_x-\!\langle\bigcirc\rangle\!-\right]_z$$

group
wherein
   $R^{13}$ is lower alkyl, $x$ is an integer of 1 to 10 and $z$ is an integer of 1 to 10;

a $-CH_2\!\!\left[O\text{-}R^{14}\right]_{\!r}$
group
wherein
   $R^{14}$ is lower alkyl and $r$ is an integer of 1 to 100;

a $-CH_2\!\!\left[O-CH_2-O-CH_2-CH_2\right]_{\!s}$
group
wherein
   $s$ is an integer of 1 to 100; and $R^2$ is H or $CH_3$;
at a temperature below the tacky point of the olefin polymer and at a pressure sufficient to maintain the xylene within the reaction zone.

7. A modified polyolefin composition according to claim 6 wherein the olefin polymer is polypropylene, polyethylene, or a copolymer of ethylene and propylene.

8. A modified polyolefin composition of claim 6 wherein the polymerizable compound is glycidyl acrylate or glycidyl methacrylate.

9. A modified polyolefin composition according to claim 6 containing 5 to 90 percent by weight reinforcing filamentary material.

10. An article coated with the modified polyolefin composition of claim 6.

* * * * *